US012605937B2

(12) United States Patent
Umeda et al.

(10) Patent No.: US 12,605,937 B2
(45) Date of Patent: Apr. 21, 2026

(54) IMAGE FORMING APPARATUS

(71) Applicant: Konica Minolta, Inc., Tokyo (JP)

(72) Inventors: Katsuhiro Umeda, Musashino (JP); Shigetaka Kurosu, Hino (JP); Yusuke Nishisaka, Mitaka (JP); Hiroshi Akita, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 227 days.

(21) Appl. No.: 18/359,995

(22) Filed: Jul. 27, 2023

(65) Prior Publication Data

US 2024/0066876 A1 Feb. 29, 2024

(30) Foreign Application Priority Data

Aug. 29, 2022 (JP) ................................. 2022-136041

(51) Int. Cl.

*B41J 2/17* (2006.01)
*B41J 2/175* (2006.01)
*B41J 2/18* (2006.01)

(52) U.S. Cl.

CPC ............. *B41J 2/1707* (2013.01); *B41J 2/175* (2013.01); *B41J 2/17596* (2013.01); *B41J 2/18* (2013.01)

(58) Field of Classification Search

CPC ...... B41J 2/1707; B41J 2/175; B41J 2/17596; B41J 2/18

See application file for complete search history.

(56) References Cited

U.S. PATENT DOCUMENTS

2017/0274668 A1* 9/2017 Kawashima ......... B41J 2/17596
2019/0224982 A1* 7/2019 Miyazaki ............. B41J 2/17596

FOREIGN PATENT DOCUMENTS

JP 2005-111944 A 4/2005
JP 2007-229997 A 9/2007
JP 2020-199731 A 12/2020
KR 20190039686 A * 4/2019 ................ B41J 2/18

* cited by examiner

*Primary Examiner* — Justin Seo
(74) *Attorney, Agent, or Firm* — LUCAS & MERCANTI, LLP

(57) ABSTRACT

An image forming apparatus includes a main tank that stores an ink, an ink head that ejects the ink, a first supply channel connected to the main tank, a second supply channel for supplying the ink from the first supply channel to the ink head, and a discharge channel for discharging the ink from the first supply channel without allowing the ink to pass through the ink head. The second supply channel is provided with a first supply valve, and the discharge channel is provided with a discharge valve.

15 Claims, 7 Drawing Sheets

IMAGE FORMING APPARATUS

The entire disclosure of Japanese Patent Application No. 2022-136041, filed on Aug. 29, 2022, is incorporated herein by reference in its entirety.

BACKGROUND

Technological Field

The present disclosure relates to an image forming apparatus.

Description of the Related Art

Japanese Laid-Open Patent Publication No. 2007-229997, Japanese Laid-Open Patent Publication No. 2020-199731, and Japanese Laid-Open Patent Publication No. 2005-111944, each disclose an image forming apparatus for forming an image on a recording medium by ejecting ink onto the recording medium from an ink head. In such an image forming apparatus, clogging may occur due to non-uniformity of an ink component, a foreign substance, or the like, and thus ejection failure of ink may occur.

Japanese Laid-Open Patent Publication No. 2007-229997 discloses that ejection failure of ink from an ink head is prevented by vibrating a pigment that adheres or stays in an ink channel to eliminate the adhesion or stay. Further, Japanese Laid-Open Patent Publication No. 2020-199731 discloses that a recovery process of agitating ink is performed.

Further, Japanese Laid-Open Patent Publication No. 2005-111944 discloses that an intermediate tank provided with a foreign substance take-out port at the bottom is provided, and the foreign substance that has precipitated is taken out to the outside by opening the foreign substance take-out port.

SUMMARY

In an image forming apparatus that forms an image by ejecting ink, clogging can be cleared by vibration, stirring, or the like in this manner. However, only by the vibration or the stirring, the ink component attached for example to the inside of the ink channel flows in the ink channel still in a non-uniform state. Similarly, in the method in which the foreign substance is precipitated and taken out to the outside, some foreign substance is not precipitated, and some foreign substance which is not precipitated flows in the ink channel. As described above, when non-uniform ink or ink containing a foreign substance is supplied to the ink head, image defects may occur or the ink head may be clogged with ink.

An object of the present disclosure is to prevent occurrence of an image defect and clogging of an ink head due to non-uniform ink or ink mixed with a foreign substance.

To achieve at least one of the abovementioned objects, an image forming apparatus reflecting one aspect of the present invention comprises: a main tank that stores ink; an ink head that ejects the ink; a first supply channel connected to the main tank; a second supply channel for supplying the ink from the first supply channel to the ink head; a discharge channel for discharging the ink from the first supply channel without allowing the ink to pass through the ink head; and a switching valve that switches a channel to be connected to the first supply channel, between the second supply channel and the discharge channel.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
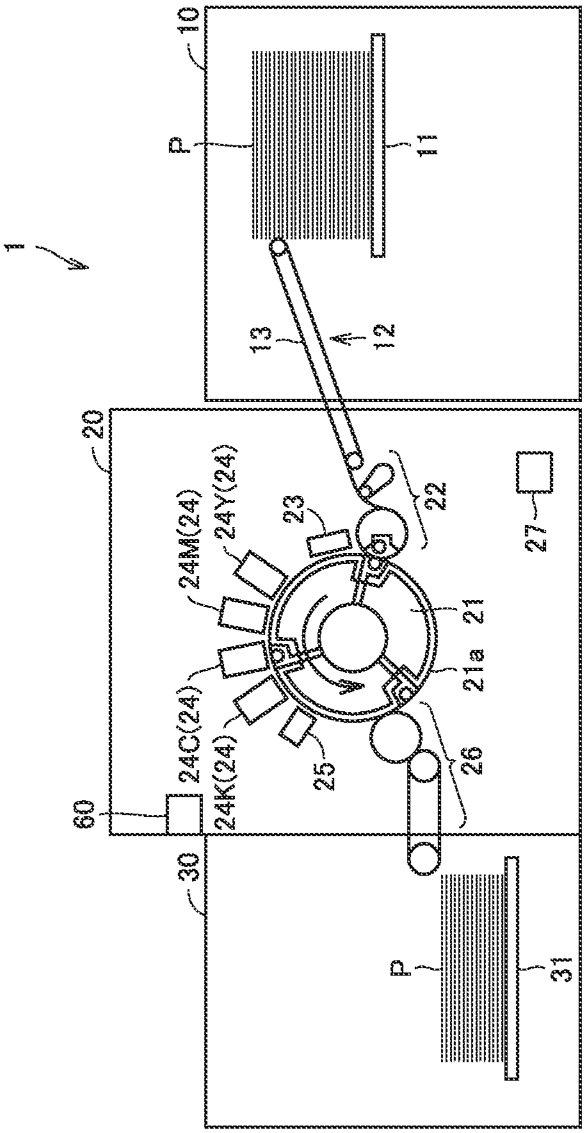
FIG. 1 is a diagram illustrating an image forming apparatus.

Hereinafter, one or more embodiments of the present invention will be described with reference to the drawings. However, the scope of the invention is not limited to the disclosed embodiments.

In the following description, the same parts and constituent elements are denoted by the same reference characters. Their names and functions are also the same. Therefore, detailed description thereof will not be repeated. Note that the embodiments and modification examples described below may be selectively combined as appropriate.

<A. Overview of Image Forming Apparatus>

An overview of an image forming apparatus will be described with reference to FIG. 1. FIG. 1 is a diagram illustrating the image forming apparatus. With reference to FIG. 1, the image forming apparatus 1 is an inkjet printer that ejects ink to form an image on a recording medium P. The image forming apparatus 1 may be a monochrome inkjet printer or a color inkjet printer. In one example, the image forming apparatus 1 according to the present embodiment is a color inkjet printer that ejects ink of four colors, i.e., yellow, magenta, cyan, and black.

As the ink, liquid-based ink is used. In one example, gel ink is used for image formation in the image forming apparatus 1 according to the present embodiment. The gel ink contains a gelling agent, changes into a gel state or a sol state depending on the temperature, and has a property of being cured by irradiation with energy rays such as ultraviolet rays. The ink contains a plurality of wax components having different melting points.

The image forming apparatus 1 includes a sheet feed section 10, an image forming section 20, a sheet ejection section 30, and a controller 60. In the image forming apparatus 1, the recording medium P accommodated in the sheet feed section 10 is conveyed to the image forming section 20, an image is formed on the recording medium P by the image forming section 20, and the recording medium P on which the image is formed is conveyed to the sheet ejection section 30. As the recording medium P, for example, various media can be used on which ink ejected onto the surface can be solidified, such as a sheet of paper or a sheet-like resin.

The sheet feed section 10 conveys the recording medium P to the image forming section 20. The sheet feed section 10 includes a sheet feed tray 11 on which the recording medium P is placed, and a supply section 12 that supplies the recording medium P from the sheet feed tray 11 to the image forming section 20. The supply section 12 includes a ring-shaped belt 13 supported by two rollers. Rotation of the roller with the recording medium P placed on the belt 13 conveys the recording medium P from the sheet feed tray 11 to the image forming section 20.

The image forming section 20 forms an image on the recording medium P. The image forming section 20 includes a conveyance drum 21, a first handover unit 22, a sheet heating section 23, an ink head unit 24, a fixing section 25, a second handover unit 26, and a waste liquid tank 27.

The conveyance drum 21 is a member that transports the recording medium P. The conveyance drum 21 has a columnar shape. The conveyance drum 21 transports the recording medium P in a conveyance direction along a conveyance surface 21*a*, which is an outer peripheral surface of the conveyance drum 21, by rotating around a rotational axis extending in a direction perpendicular to the plane of FIG. 1 in a state where the recording medium P is held on the conveyance surface 21*a*. The conveyance drum 21 is connected to a motor for rotating the conveyance drum 21, and rotates by an angle proportional to the rotation amount of the motor.

The first handover unit 22 is a unit that receives the recording medium P conveyed from the sheet feed section and sends the recording medium P to the conveyance drum 21. The first handover unit 22 is provided between the supply section 12 and the conveyance drum 21.

The sheet heating section 23 is a mechanism that heats the recording medium P. The sheet heating section 23 is provided between the first handover unit 22 and the ink head unit 24. The sheet heating section 23 heats the recording medium P so that the temperature of the recording medium P falls within a predetermined range.

The ink head unit 24 is a unit that ejects ink onto the recording medium P to form an image. The ink head unit 24 includes an ink head that ejects ink. The ink head unit 24 is disposed such that a surface of the ink head from which ink is ejected faces the conveyance surface 21*a*. The ink head unit 24 forms an image on the recording medium P by ejecting ink onto the recording medium P at an appropriate timing in accordance with the rotation of the conveyance drum 21 on which the recording medium P is held.

The ink head unit 24 is provided for each color of ink. In the present embodiment, an ink head unit 24Y that ejects a yellow ink, an ink head unit 24M that ejects a magenta ink, an ink head unit 24C that ejects a cyan ink, and an ink head unit 24K that ejects a black ink are arranged in this order from the upstream side of the conveyance path of recording medium P.

In the following description, when the ink head unit 24Y, the ink head unit 24M, the ink head unit 24C, and the ink head unit 24K are not distinguished from each other, they are referred to as "ink head units 24".

The fixing section 25 cures the ink on the recording medium P and fixes the ink to the recording medium P by irradiating the recording medium P placed on the conveyance drum 21 with energy rays such as ultraviolet rays.

The second handover unit 26 is a unit that receives the recording medium P conveyed by the conveyance drum 21 and conveys the recording medium P to the sheet ejection section 30.

The waste liquid tank 27 receives waste ink discharged from the ink head unit 24.

The sheet ejection section 30 includes a plate-like sheet ejection tray 31 on which the recording medium P after image formation conveyed from the image forming section 20 is placed.

<B. Hardware Configuration Example of Image Forming Apparatus 1>

Figure 2:
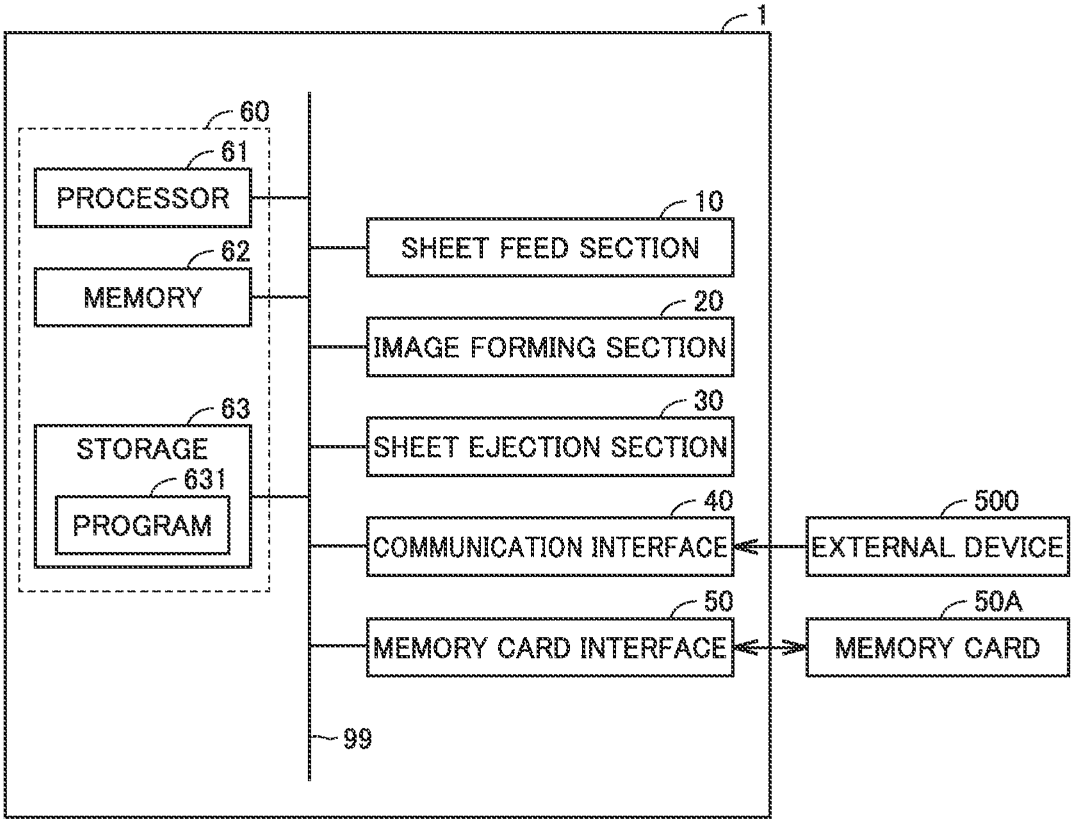
FIG. 2 is a diagram illustrating an example of a hardware configuration of the image forming apparatus.

A hardware configuration of the image forming apparatus 1 will be described with reference to FIG. 2. FIG. 2 is a diagram illustrating an example of a hardware configuration of the image forming apparatus. The image forming apparatus 1 includes a communication interface 40 and a memory card interface 50 in addition to the sheet feed section 10, the image forming section 20, the sheet ejection section 30, and the controller 60 shown in FIG. 1. The sheet feed section 10, the image forming section 20, the sheet ejection section 30, the communication interface 40, the memory card interface 50, and the controller 60 are electrically connected to each other via a bus 99.

The communication interface 40 is in charge of transmission and reception of data between the image forming apparatus 1 and an external device 500. The external device 500 is, for example, a terminal device used by a user. As an example, the communication interface 40 receives image data to be printed from the external device 500.

The controller 60 includes a processor 61, a memory 62, and a storage 63. The processor 61 includes, for example, a central processing unit (CPU), a micro-processing unit (MPU), or the like. The memory 62 is constituted of a volatile storage device such as a dynamic random access memory (DRAM) or a static random access memory (SRAM). The storage 63 is constituted of a nonvolatile storage such as a solid state drive (SSD) or a flash memory, for example. The storage 63 stores a program 631. The program 631 includes computer-readable instructions for controlling the image forming apparatus 1. The processor 61 implements various types of processes according to the present embodiment by loading a program 631 stored in the storage 63 into the memory 62 and executing the program 631.

The program 631 is provided by being stored in a storage medium such as a memory card 50A. The program 631 is read from the memory card 50A and installed in the image forming apparatus 1 by the memory card interface 50.

The program 631 may be provided not as a single program but as a part of an arbitrary program. In this case, the process according to the present embodiment is realized in cooperation with an arbitrary program. Such a program that does not include some of the modules does not depart from the intended image forming apparatus 1 according to the present embodiment. A part or all of the functions provided by the program 631 may be realized by dedicated hardware.

Instead of installing, in the image forming apparatus 1, the program 631 stored in the memory card 50A, a program downloaded from a distribution server or the like may be installed in the image forming apparatus 1.

<C. Configuration of Ink Head Unit 24 of Image Forming Apparatus 1>

Figure 3:
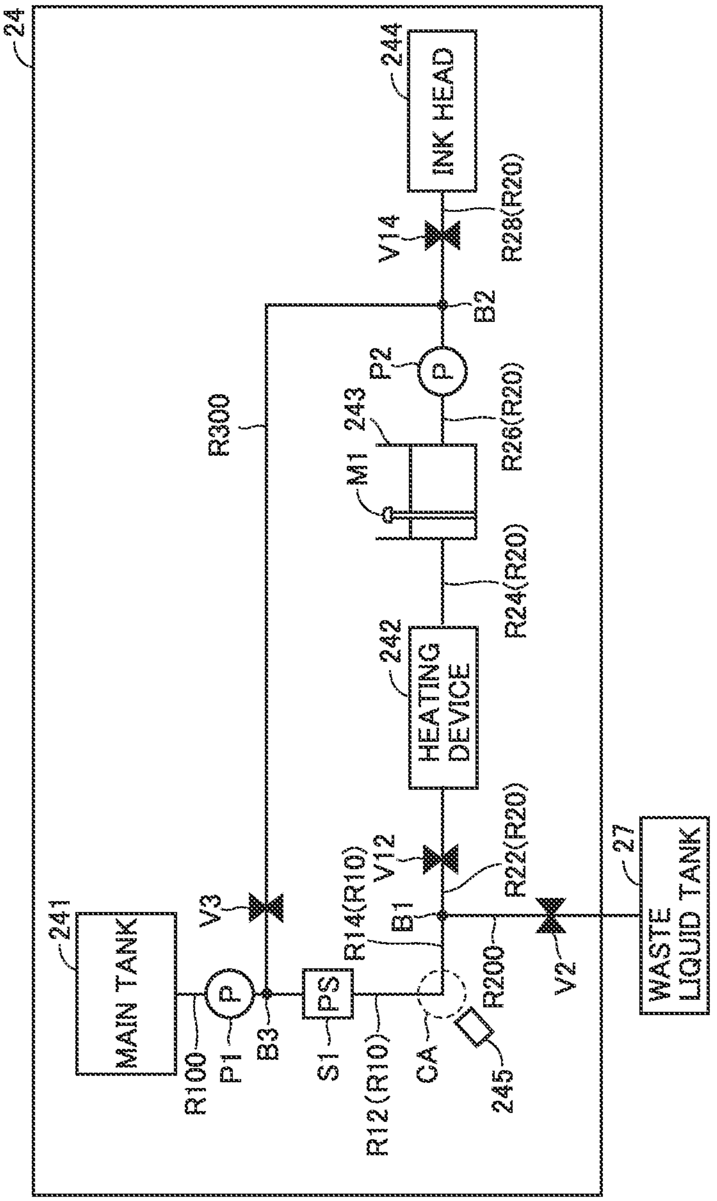
FIG. 3 is a diagram illustrating a configuration of an ink head unit.

Referring to FIG. 3, the ink head unit 24 will be described. FIG. 3 is a diagram illustrating a configuration of an ink head unit.

Referring to FIG. 3, the ink head unit 24 includes a main tank 241, a heating device 242, a storage tank 243, an ink head 244, clearance means 245, a supply pump P1, a circulation pump P2, a first supply valve V12, a second supply valve V14, a discharge valve V2, a circulation valve V3, a sensor M1, a pressure sensor S1, and an ink channel. The ink channel is a channel through which ink flows. The ink channel includes a supply channel R100, a discharge channel R200, and a circulation channel R300.

The supply channel R100 is connected to the main tank 241. The discharge channel R200 is connected to a first branch point B1 of the supply channel R100 between the heating device 242 and a specific location CA where the clearance means 245 is provided. The supply channel R100 includes a first supply channel R10 connected to the main tank 241 and a second supply channel R20 connected to the ink head 244 with the first branch point B1 as a boundary between the first and second supply channels.

The discharge channel R200 is a channel for discharging the ink from the first supply channel R10 without allowing the ink to pass through the ink head 244. In the present embodiment, one end of the discharge channel R200 is connected to the first branch point B1 of the supply channel R100, and the other end is connected to the waste liquid tank 27.

The circulation channel R300 is a channel for delivering the ink in the second supply channel R20 to the first supply channel R10 without allowing the ink to pass through the ink head 244. One end of the circulation channel R300 is connected to a second branch point B2 of the second supply channel R20 between the storage tank 243 and the ink head 244. The other end of the circulation channel R300 is connected to a confluence point B3 of the first supply channel R10 between the main tank 241 and the specific location where the clearance means 245 is provided.

The first supply valve V12 is provided in a channel R22 of the second supply channel R20 between the first branch point B1 and the heating device 242. The second supply valve V14 is provided in a channel R28 of the second supply channel R20 between the second branch point B2 and the ink heads 244. The discharge valve V2 is provided on the discharge channel R200. The circulation valve V3 is provided on the circulation channel R300. Opening and closing of each of the first supply valves V12, the second supply valves V14, the discharge valves V2, and the circulation valves V3 are controlled by the controller 60.

The supply pump P1 is provided in a channel R12 of the first supply channel R10 between the main tank 241 and the specific location CA where the clearance means 245 is provided. More specifically, the supply pump P1 is provided in the channel R12 between the main tank 241 and the confluence point B3. The supply pump P1 is controlled by the controller 60, and delivers ink from the main tank 241 to the first branch point B1 as the supply pump P1 is driven.

The pressure sensor S1 is provided in a channel R12 of the first supply channel R10 between the main tank 241 and the specific location CA. More specifically, the pressure sensor S1 is provided in the channel R12 of the first supply channel R10 between the confluence point B3 and the specific location CA. The pressure sensor S1 detects a pressure in the channel R12 between the specific location CA and the main tank 241.

The clearance means 245 is provided at the specific location CA where clogging with the ink on the first supply channel R10 is likely to occur, and clears the clogging with the ink. The clearance means 245 clears the clogging with the ink by, for example, heating the specific location CA or stirring the ink in the specific location CA.

The specific location CA is a location where at least one of a change in the direction in which the ink flows and a change in the temperature of the ink occurs. Due to this, in the specific location CA, the ink is likely to stay or ink components are likely to be precipitated, and as a result, clogging with the ink is likely to occur. In other words, the specific location CA is a location where clogging with ink is likely to occur.

The heating device 242 is provided in the second supply channel R20. The heating device 242 heats the ink supplied from the first supply channel R10. In other words, the heating device 242 heats the ink supplied from the main tank 241. The heating device 242 heats the supplied ink to dissolve the ink into a sol state. Thus, the viscosity of the ink increases.

The storage tank 243 is provided in the second supply channel R20, more specifically, in a channel R24 connected to the heating device 242. The storage tank 243 stores the ink heated by the heating device 242. The sensor M1 provided in the storage tank 243 detects a liquid amount of the ink in the storage tank 243. The sensor M1 may be a liquid level sensor that measures the height of the liquid surface of the ink in the storage tank 243 or a weight sensor that measures the weight of the ink in the storage tank 243. The sensor M1 outputs a detection result to the controller 60.

The circulation pump P2 is provided in the second supply channel R20, more specifically, in a channel R26 between the storage tank 243 and the second branch point B2. The circulation pump P2 is controlled by the controller 60, and delivers the ink in the storage tank 243 to the second branch point B2 in accordance with the driving of the circulation pump P2.

The second supply channel R20, more specifically, a channel R28 extending from the second branch point B2, is connected to the ink head 244. The ink head 244 forms an image on the recording medium P by ejecting ink based on an instruction from the controller 60.

As described above, the ink head unit 24 includes the first supply channel R10 connected to the main tank 241, the second supply channel R20 for supplying the ink from the first supply channel R10 to the ink head 244, and the discharge channel R200 for discharging the ink from the first supply channel R10 without allowing the ink to pass through the ink head 244.

In a case where the first supply valve V12 and the second supply valve V14 are opened and the circulation valve V3 is closed, the channel connected to the first supply channel R10 is the second supply channel R20 for supplying ink to the ink head 244. On the other hand, in a case where at least the first supply valve V12 is closed and the circulation valve V3 is opened, the channel connected to the first supply channel R10 is the discharge channel R200.

That is, the first supply valve V12, the second supply valve V14, and the discharge valve V2 function as a switching valve that switches a channel to be connected to the first supply channel R10, between the second supply channel R20 and the discharge channel R200.

The controller 60 supplies ink to the ink head 244, clears ink clogging, and discharges ink, by controlling the control valves and pumps described above.

In a case where the ink is to be discharged, the controller 60 closes the first supply valve V12 and opens the discharge valve V2. In other cases, the controller 60 opens the first supply valve V12 and closes the discharge valve V2. When the liquid amount of the ink in the storage tank 243 is less than a predetermined value, the controller 60 supplies the ink from the main tank 241 to the storage tank 243 by driving the supply pump P1. In addition, in a case where the ink in the first supply channel R10 is to be discharged, the controller 60 closes the first supply valve V12, opens the discharge valve V2, and drives the supply pump P1.

In order to clear the clogging with the ink, in a case where the ink in the second supply channel R20 is to be delivered to the first supply channel R10, the controller 60 closes the second supply valve V14 and opens the circulation valve V3. In other cases, the controller 60 opens the second supply valve V14 and closes the circulation valve V3. When forming an image, the controller 60 drives the circulation pump P2 to supply ink from the storage tank 243 to the ink head 244. Further, in a case where the ink in the second supply channel R20 is to be delivered to the first supply channel R10, the controller 60 closes the second supply valve V14, opens the circulation valve V3, and drives the circulation pump P2.

<D. Procedure of Process Executed in Image Forming Apparatus>

Figure 4:
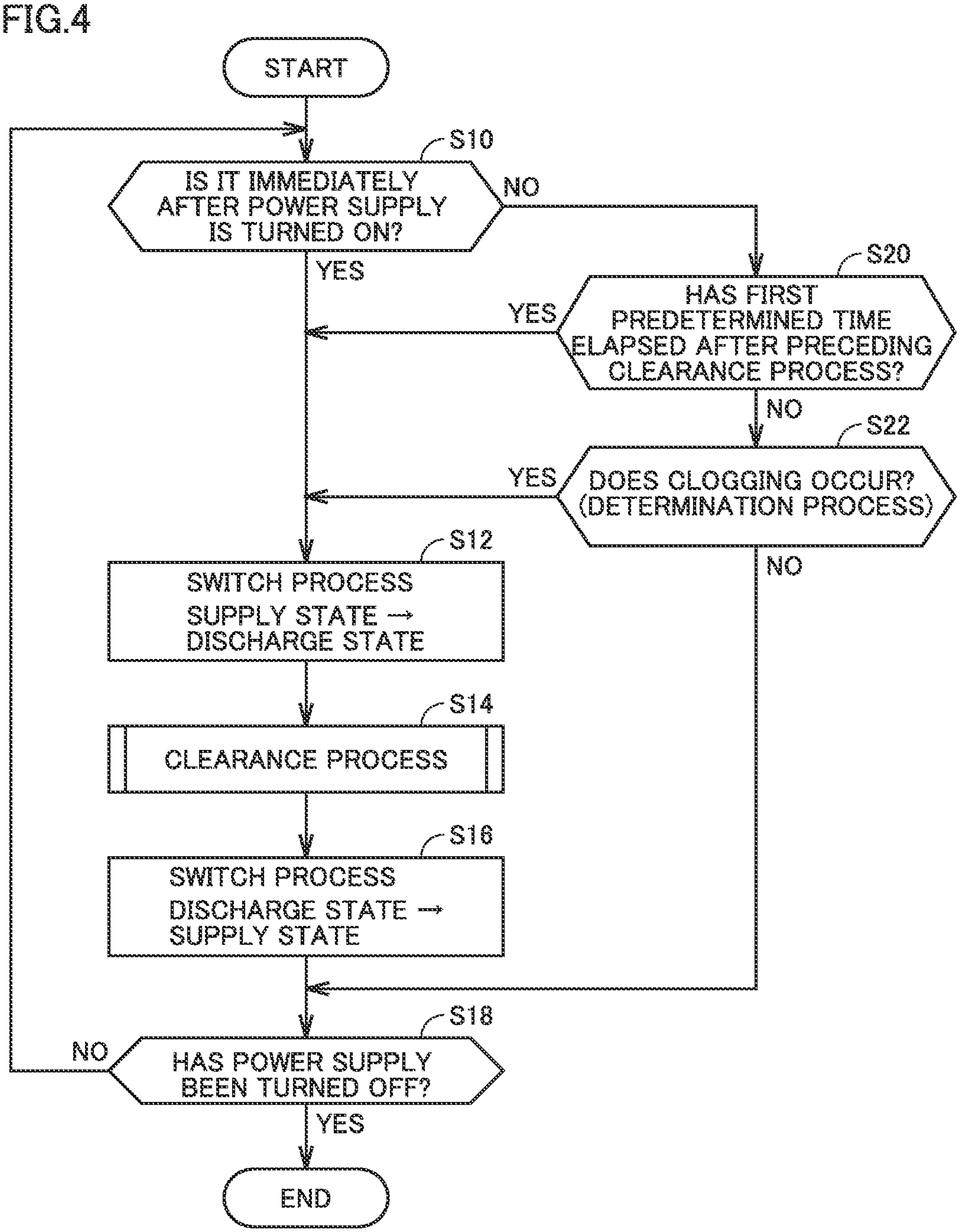
FIG. 4 is a flowchart showing a procedure of a process executed in the image forming apparatus.

FIG. 4 is a flowchart showing a procedure of a process executed in the image forming apparatus. The process illustrated in FIG. 4 is executed by the processor 61 described above. Hereinafter, step is abbreviated as "S".

In S10, the processor 61 determines whether or not it is immediately after a power supply for the image forming apparatus 1 is turned on. In a case where it is immediately after the power supply for the image forming apparatus 1 is turned on (YES in S10), the processor 61 advances the process to S12. ON and OFF of the power supply are switched by pressing a power button (not illustrated).

In S12, the processor 61 performs a switch process to switch a supply state to a discharge state. More specifically, the processor 61 closes the first supply valve V12 and opens the discharge valve V2. As a result, the discharge state in which the first supply channel R10 and the discharge channel R200 are connected to each other while the first supply channel R10 and the second supply channel R20 are disconnected from each other is generated.

In S14, the processor 61 performs a clearance process for clearing clogging with ink. In the clearance process, for example, the processor 61 performs a process for clearing ink clogging, and then drives the supply pump P1 to discharge the ink in the first supply channel R10 through the discharge channel R200. A specific clearance method will be described later.

Upon completion of the clearance process, in S16, the processor 61 performs a switch process to switch the discharge state to the supply state. More specifically, the processor 61 opens the first supply valve V12 and closes the discharge valve V2. Accordingly, the supply state in which the first supply channel R10 and the discharge channel R200 are disconnected from each other and the first supply channel R10 and the second supply channel R20 are connected to each other is generated.

In S18, the processor 61 determines whether or not the power supply for the image forming apparatus 1 has been turned off. When the power supply for the image forming apparatus 1 has been turned off (YES in S18), the processor 61 ends the process. On the other hand, in a case where the power supply for the image forming apparatus 1 has not been turned off (NO in S18), the processor 61 returns the process to S10.

In a case where it is not immediately after the power supply for the image forming apparatus 1 is turned on (NO in S10), the processor 61 advances the process to S20.

In S20, the processor 61 determines whether or not a first predetermined period has elapsed after the preceding clearance process. The first predetermined period can be set to any period, for example, three hours. When the first predetermined period has elapsed after the preceding clearance process (YES in S20), the processor 61 advances the process to S12. When the first predetermined period has not elapsed after the preceding clearance process (NO in S20), the processor 61 advances the process to S22.

In S22, the processor 61 performs a determination process of determining whether or not clogging has occurred. When clogging has occurred (YES in S22), the processor 61 advances the process to S12. In a case where no clogging has occurred (NO in S22), the processor 61 advances the process to S18. A determination process of determining occurrence of clogging will be described later with reference to FIG. 5.

As described above, the processor 61 performs the clearance process in response to an event that the power supply is turned on, in response to an event that the first predetermined period has elapsed after execution of the preceding clearance process, or in response to an event that ink clogging occurs. In a case where it is immediately after turn-on of the power supply, or the first predetermined period has elapsed after execution of the preceding clearance process, there is a possibility that a foreign substance is deposited or an ink component is deposited in the specific location CA which is likely to be clogged with ink. Therefore, by performing the clearance process, it is possible to clear the clogging with the ink and to discharge a causative substance of the clogging through the discharge channel R200. As a result, it is possible to prevent the causative substance of clogging from flowing into the ink head 244, and it is possible to prevent clogging of the ink head 244 with the causative substance or degradation of the image quality of printed matter caused by clogging of the ink head 244 with the causative substance.

In addition, in a case where the clearance process is performed, the processor 61 controls the first supply valve V12 and the discharge valve V2 such that the first supply channel R10 and the discharge channel R200 are connected to each other and the first supply channel R10 and the second supply channel R20 are disconnected from each other. Accordingly, a foreign substance and/or a non-uniform ink component flowing in the ink channel when the ink clogging is cleared can be discharged through the discharge channel R200, and the foreign substance and/or the non-uniform ink component can be prevented from being delivered to the ink head 244.

<E. Clearance Process>

The processor 61 clears the clogging with the ink by using the clearance means 245 or circulating the ink.

The clearance means 245 is, in one example, a heating device for heating the ink. The processor 61 controls the heating device so as to heat the first supply channel R10 in the clearance process.

In the main tank 241, the ink is not heated. On the other hand, the ink delivered from the main tank 241 is heated in the heating device 242. For this reason, the temperature of the ink changes at the specific location CA on the first supply channel R10 between the main tank 241 and the heating device 242, due to the heat transfer from the heating device 242. Accordingly, a wax component having a low melting point in the ink is melted and flows in the specific location CA, whereas a wax component having a high melting point in the ink is separated and deposited in the specific location CA, and thus the ink components become non-uniform.

The heating device can melt the deposited wax component by heating the first supply channel R10. The controller 60 can cause the melted wax component to flow by driving the supply pump P1 while heating the first supply channel R10 by the clearance means 245 that is a heating device, and thus can clear the clogging with the ink.

Another example of the clearance means 245 is external force application means that applies an external force to ink. The external force application means is, for example, a stirring device for stirring the ink, and one example is a stirrer, an ultrasonic wave generating device, or the like. Further, the external force application means may be a pressure application device that applies pressure to the ink. The stirrer, the ultrasonic wave generating device, and the pressure application device are each an example of the "external force application device" in the present disclosure.

The controller 60 applies an external force to the ink in the first supply channel R10 by the clearance means 245, which is the external force application means, and drives the supply pump P1 so that a wax component and/or a foreign substances deposited in the first supply channel R10 can be caused to flow, and thus, the clogging with the ink can be cleared.

When the ink clogging is to be cleared by the clearance means 245, the controller 60 drives the supply pump P1 to cause the ink in the specific location CA to flow toward the first branch point B1. As described with reference to FIG. 4, the first supply channel R10 and the discharge channel R200 are connected to each other, whereas the first supply channel R10 and the second supply channel R20 are disconnected from each other. Therefore, as the supply pump P1 is driven, the ink in the specific location CA is discharged to the waste liquid tank 27 through the discharge channel R200.

In addition, the controller 60 can clear clogging with the ink by circulating the ink. More specifically, the controller 60 closes the second supply valve V14, opens the circulation valve V3, and drives the circulation pump P2 to deliver the ink in the second supply channel R20 to the channel R12 located upstream of the specific location CA.

The ink in the second supply channel R20 is ink to be supplied to the ink head 244 and is adjusted uniformly by the heating device 242 or the like. By delivering the uniformly adjusted ink to the upstream side of the specific location CA, the uniformly adjusted ink flows into the specific location CA.

In this way, since the uniformly adjusted ink flows into the specific location CA, the non-uniform ink in the specific location CA is diluted with the uniform ink. For example, in the present embodiment, since the ink heated by the heating device 242 flows into the specific location CA, the same effect as in the case of heating by the heating device can be obtained, and the clogging with the ink can be cleared.

In a case where the circulation pump P2 is driven for the clearance process, the ink in the specific location CA flows in the direction toward the first branch point B1. As described with reference to FIG. 4, the first supply channel R10 and the discharge channel R200 are connected to each other, whereas the first supply channel R10 and the second supply channel R20 are disconnected from each other. Therefore, as the supply pump P1 is driven, the ink in the specific location CA is discharged to the waste liquid tank 27 through the discharge channel R200.

As described above, when the clearance process is performed, the ink in the specific location CA is discharged to the waste liquid tank 27 through the discharge channel R200. Although the clogging with the ink is cleared by the clearance process, there is a possibility that ink components are still non-uniform and/or a foreign substance is contained. When such ink is supplied to the ink head 244, an image defect may occur or the ink head 244 may be clogged with the ink.

In the present embodiment, the image forming apparatus 1 includes the discharge channel R200 for discharging the ink in the first supply channel R10 having the specific location CA, without allowing the ink to pass through the ink head 244, and the channel to be connected to the first supply channel R10 is switched between the second supply channel R20 and the discharge channel R200. Therefore, it is possible to prevent the occurrence of image defects and clogging of the ink head 244 due to non-uniform ink or ink mixed with a foreign substance. Further, as compared with a case where the ink is discharged from the ink head 244, the channel is shortened by the length of the second supply channel R20, so that the amount of discharged ink can be reduced.

In other words, in the present embodiment, in the image forming apparatus 1, the discharge channel R200 is connected to the first branch point B1 located downstream of the specific location CA where ink clogging is likely to occur. As a result, non-uniform ink in the specific location CA can be discharged through the discharge channel R200. In addition, since the discharge channel R200 is connected to the first branch point B1 in the supply channel R100, the channel is shortened by the length of the second supply channel R20, as compared with the case where the ink is discharged from the ink head 244, so that the amount of discharged ink can be reduced.

<F. Determination Process>

Figure 5:
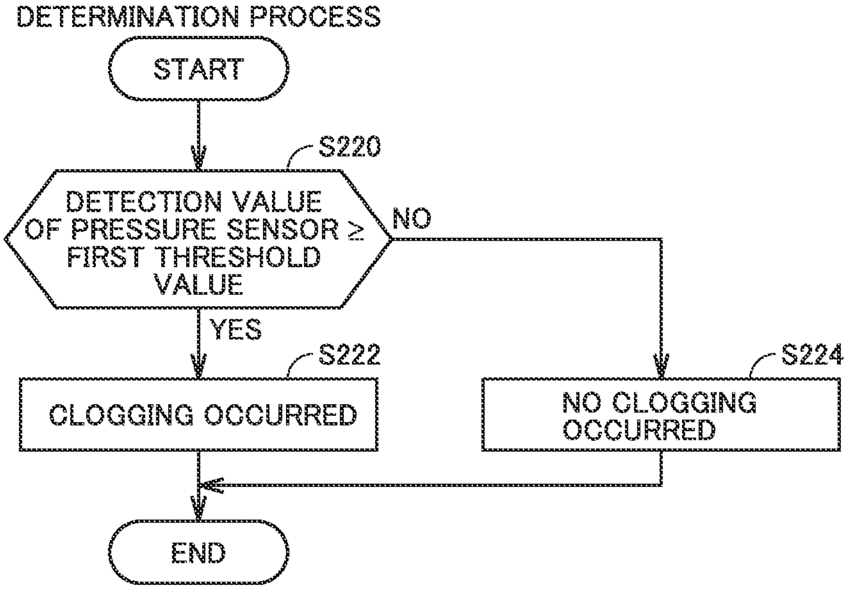
FIG. 5 is a flowchart illustrating a procedure of determination process.

A determination process of determining clogging with ink will be described with reference to FIG. 5. FIG. is a flowchart illustrating a procedure of the determination process. The process illustrated in FIG. 5 is executed by the aforementioned processor 61 when the process in S22 in FIG. 4 is performed.

In S220, the processor 61 determines whether or not a detection value of the pressure sensor S1 is greater than or equal to a first threshold value.

If the detection value of the pressure sensor S1 is greater than or equal to the first threshold value (YES in S220), the processor 61 advances the process to S222, determines that clogging has occurred, and ends the determination process.

On the other hand, in a case where the detection value of the pressure sensor S1 is less than the first threshold value (NO in S220), the processor 61 advances the process to S224, determines that no clogging has occurred, and ends the determination process.

When the determination process is completed, the process returns to S22 in FIG. 4 and, in a case where it is determined that clogging has occurred, the process proceeds to S12 and in a case where it is determined that no clogging has occurred, the process proceeds to S18.

The pressure sensor S1 is provided in the channel R12 between the specific location CA and the main tank 241 that is located upstream of the specific location CA. When clogging occurs on the specific location CA side located downstream of the location where the pressure sensor S1 is provided, the pressure in the channel R12 increases. Therefore, by monitoring the pressure in the channel R12 with the pressure sensor S1, it is possible to determine whether or not clogging occurs on the specific location CA side.

Figure 6:
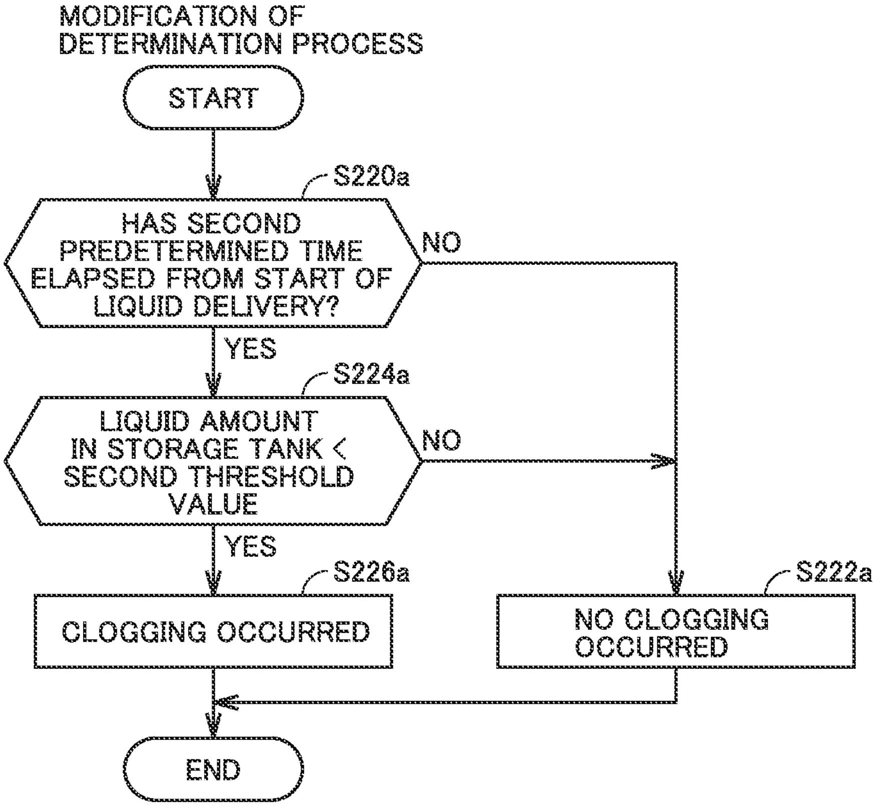
FIG. 6 is a flowchart illustrating a procedure of a determination process according to a modification example.

Note that the method of determining whether or not clogging has occurred is not limited to the method using the pressure sensor S1. FIG. 6 is a flowchart illustrating a procedure of a determination process according to a modification example. The process illustrated in FIG. 6 is executed by the aforementioned processor 61 when the process in S22 of FIG. 4 is performed.

In S220*a*, the processor 61 determines whether or not a second predetermined period has elapsed from driving of the supply pump P1. In a case where the second predetermined period has not elapsed (NO in S220*a*), the processor 61 advances the process to S222*a*, determines that no clogging has occurred, and ends the determination process.

On the other hand, when the second predetermined period has elapsed (YES in S220*a*), the processor 61 advances the process to S224*a*.

In S224*a*, the processor 61 determines whether or not the liquid amount in the storage tank 243 has reached a second threshold value. Upon determination that the second threshold value has been reached (NO in S224*a*), the processor 61 advances the process to S222*a*, determines that no clogging has occurred, and ends the determination process.

On the other hand, in a case where it is determined that the second threshold value has not been reached (YES in S224*a*), the processor 61 advances the process to S226*a*, determines that clogging has occurred, and ends the determination process.

When the determination process is completed, the process returns to S22 in FIG. 4 and, in a case where it is determined that clogging has occurred, the process proceeds to S12 and in a case where it is determined that no clogging has occurred, the process proceeds to S18.

The second predetermined time is determined based on the period from the time when driving of the supply pump P1 is started to the time when the amount of ink in the storage tank 243 reaches the second threshold value in a case where the first supply channel R10 is not clogged with ink. That is, the second predetermined time is set to be longer than the time required for the amount of ink in the storage tank 243 to reach the second threshold value from a reference value in a case where the supply pump P1 is driven in a state where the first supply channel R10 is not clogged with ink. Therefore, in a case where the liquid amount in the storage tank 243 has not reached the second threshold value even when the time for which the supply pump P1 is driven reaches the second predetermined time, it is expected that the inside of the first supply channel R10 is clogged with the ink, and the processor 61 determines that the ink clogging has occurred.

As described above, the ink clogging is detected by the determination process, and the clearance process is performed in a case where the ink clogging has occurred. Therefore, it is possible to clear the ink clogging at an early stage, and to prevent a failure in advance.

<G. Timing of Switch Process>

In the embodiment described above, the processor 61 performs the switch process for switching the supply state to the discharge state before performing the clearance process. The timing of the switch process is not limited to the timing before the clearance process. For example, the processor 61 may perform the switch process during the clearance process. For example, the processor 61 may perform the switch process after clearance of the ink clogging by the clearance means 245 and before the driving of the supply pump P1.

In other words, the processor 61 may perform the switch process at a predetermined timing before driving the pump in the clearance process.

<H. Modification Example of Discharge Channel>

Figure 7:
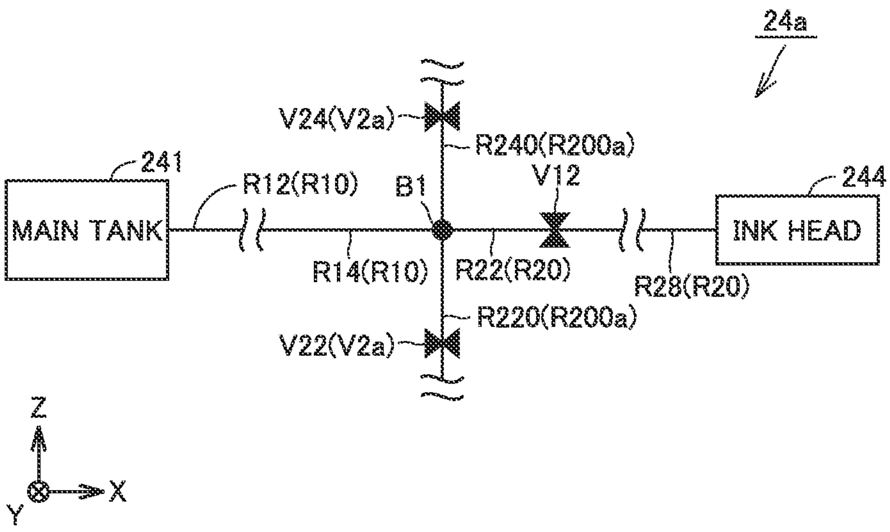
FIG. 7 is a diagram illustrating an ink head unit according to a modification example.

FIG. 7 is a diagram illustrating an ink head unit according to a modification example. The Z-axis direction in the drawing indicates the vertical direction, and a plane orthogonal to the Z-axis direction is defined as an XY plane. The direction of gravity is downward in the Z-axis direction. The upper in the Z-axis direction is abbreviated as “upper” and the lower in the Z-axis direction is abbreviated as “lower”. In FIG. 7, portions common to FIG. 3 are not shown.

An ink head unit 24*a* according to the modification example includes a discharge channel R200*a*. The discharge channel R200*a* includes a lower channel R220 for discharging ink from a lower end side of the first branch point B1 and an upper channel R240 for discharging ink from an upper end side of the first branch point B1.

A discharge valve V2*a* includes a lower valve V22 provided in the lower channel R220 and an upper valve V24 provided in the upper channel R240.

Note that the other configuration is common to the ink head unit 24 illustrated in FIG. 3, and hence description thereof is omitted. The lower channel R220 and the upper channel R240 may be connected to the same waste liquid tank 27, or may be connected to different waste liquid tanks.

Since the lower channel R220 discharges the ink from the lower end side of the first supply channel R10, the lower channel R220 is suitable for discharging a foreign substance and/or a pigment that is accumulated on the bottom of the channel and has a higher specific weight than the main component of the ink. On the other hand, since the upper channel R240 discharges the ink from the upper end side of the first supply channel R10, the upper channel is suitable for discharging a foreign substance and/or a wax component that is floating in the ink and has a lower specific weight than the main component of the ink.

Note that the controller 60 may determine a discharge channel to be connected to the first supply channel R10, depending on the cause of ink clogging. The controller 60 determines the discharge channel to be connected to the first supply channel R10 at the time of discharge, depending on components of the ink to be used.

For example, when the ink to be used contains pigments but does not contain wax components, the controller 60, at the time of discharging, closes the upper valve V24 and opens the lower valve V22 to discharge the ink from the lower channel R220. When the ink to be used contains wax components but does not contain pigments, the controller 60, at the time of discharging, closes the lower valve V22 and opens the upper valve V24 to discharge the ink from the upper channel R240.

In this way, by changing the discharge direction of the ink depending on the causative substance of the clogging with the ink, it is possible to more reliably discharge the causative substance and to reduce the amount of discharged ink.

<I. Other Modification Examples>

In the above-described embodiment, the image forming apparatus 1 switches the channel to be connected to the first supply channel R10, between the second supply channel R20 and the discharge channel R200 by the first supply valve V12 and the discharge valve V2. Note that a three-way valve may be provided at the first branch point B1 to switch the channel by means of the single valve.

In the above-described embodiment, the ink head unit 24 includes the heating device 242 between the storage tank 243 and the first branch point B1. Note that the storage tank 243 may be provided with a heating device.

In the above-described embodiment, the method of heating the specific location CA, the method of stirring the ink in the specific location CA, and the method of circulating the ink are each described as an example of the method of clearing the clogging with the ink. The controller 60 may clear the ink clogging by a combination of these methods, may clear the ink clogging by at least one of these methods, or may clear the ink clogging by a method different from any of these methods.

In the above-described embodiment, the method of detecting the pressure in the channel and the method of detecting the liquid amount in the storage tank 243 are each described as an example of the method of determining whether clogging with ink has occurred. Note that the method of determining whether clogging with ink has occurred is not limited to these methods. For example, in a case where the supply pump P1 is driven by a motor, determination as to whether or not ink clogging has occurred may be performed by monitoring a load applied to the motor.

In the embodiment described above, the controller 60 performs the clearance process in response to an event that the power supply is turned on, in response to an event that the first predetermined period has elapsed after execution of the preceding clearance process, or in response to occurrence of clogging with ink. The controller 60 may perform the clearance process in response to satisfaction of at least one of these three conditions.

[Supplementary Note]

The above-described embodiment and modification examples include the following technical ideas.

[Configuration 1]

An image forming apparatus comprising:

a main tank that stores ink;

an ink head that ejects the ink;

a first supply channel connected to the main tank;

a second supply channel for supplying the ink from the first supply channel to the ink head;

a discharge channel for discharging the ink from the first supply channel without allowing the ink to pass through the ink head; and a switching valve that switches a channel to be connected to the first supply channel, between the second supply channel and the discharge channel.

[Configuration 2]

The image forming apparatus according to Configuration 1, further comprising a controller that executes a clearance process for clearing clogging with the ink on the first supply channel.

[Configuration 3]

The image forming apparatus according to Configuration 2, wherein the controller controls, when executing the clearance process, the switching valve such that the first supply channel and the discharge channel are connected to each other while the first supply channel and the second supply channel are disconnected from each other.

[Configuration 4]

The image forming apparatus according to Configuration 2 or 3, wherein the controller executes the clearance process in response to occurrence of either an event that a power supply for the image forming apparatus is turned on or an event that a first predetermined time has elapsed after execution of the clearance process.

[Configuration 5]

The image forming apparatus according to any one of Configurations 2 to 4, wherein the controller executes the clearance process in response to occurrence of clogging with the ink.

[Configuration 6]

The image forming apparatus according to Configuration 5, further comprising a pressure sensor that detects a pressure in a channel between the main tank and a location on the first supply channel, the location being a location that is likely to be clogged with the ink, wherein the controller executes the clearance process when a detection value of the pressure sensor reaches a first threshold value.

[Configuration 7]

The image forming apparatus according to Configuration 5 or 6, further comprising:

a storage tank that is provided in the second supply channel and stores the ink supplied from the main tank;

a sensor that detects a liquid amount of the ink in the storage tank; and a supply pump that supplies the ink from the main tank to the storage tank, wherein the controller executes the clearance process when the liquid amount in the storage tank does not reach a second threshold value within a second predetermined time from driving of the supply pump.

[Configuration 8]

The image forming apparatus according to any one of Configurations 2 to 7, further comprising a heating device provided in the first supply channel, wherein the controller controls the heating device to heat the first supply channel in the clearance process.

[Configuration 9]

The image forming apparatus according to any one of Configurations 2 to 8, further comprising:

a circulation channel for delivering the ink in the second supply channel to a channel between the main tank and a location on the first supply channel, without allowing the ink to pass through the ink head, the location being a location that is likely to be clogged with the ink; and a circulation pump that delivers the ink in the second supply channel to the first supply channel through the circulation channel, wherein the controller controls the circulation pump such that the ink in the second supply channel is delivered to the first supply channel through the circulation channel in the clearance process.

[Configuration 10]

The image forming apparatus according to any one of Configurations 2 to 9, further comprising an external force application means that applies an external force to the ink in the first supply channel, wherein the controller controls the external force application means so as to apply an external force to the ink in the first supply channel in the clearance process.

[Configuration 11]

The image forming apparatus according to any one of Configurations 1 to 10, wherein the discharge channel includes:

a lower channel for discharging the ink on a lower end side, in a vertical direction, of the first supply channel; and an upper channel for discharging the ink on an upper end side, in the vertical direction, of the first supply channel.

[Configuration 12]

The image forming apparatus according to Configuration 11, wherein the controller controls the switching valve such that at least one of the upper channel and the lower channel is connected to the first supply channel, depending on a cause of clogging with the ink on the first supply channel.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

a main tank that stores ink;

an ink head that ejects the ink;

a waste liquid tank;

a first supply channel connected to the main tank;

a second supply channel for supplying the ink from the first supply channel to the ink head;

a discharge channel for discharging the ink from the first supply channel to the waste liquid tank without allowing the ink to pass through the ink head; and a switching valve that switches a channel to be connected to the first supply channel, between the second supply channel and the discharge channel.

2. The image forming apparatus according to claim 1, further comprising a processor that executes a clearance process for clearing clogging with the ink on the first supply channel.

3. The image forming apparatus according to claim 2, wherein the processor controls, when executing the clearance process, the switching valve such that the first supply channel and the discharge channel are connected to each other while the first supply channel and the second supply channel are disconnected from each other.

4. The image forming apparatus according to claim 2, wherein the processor executes the clearance process in response to occurrence of either an event that a power supply for the image forming apparatus is turned on or an event that a first predetermined time has elapsed after execution of the clearance process.

5. The image forming apparatus according to claim 2, wherein the processor executes the clearance process in response to occurrence of clogging with the ink.

6. The image forming apparatus according to claim 5, further comprising a pressure sensor that detects a pressure in a channel between the main tank and a location on the first supply channel, the location being a location that is likely to be clogged with the ink, wherein the processor executes the clearance process when a detection value of the pressure sensor reaches a first threshold value.

7. The image forming apparatus according to claim 5, further comprising:

a storage tank that is provided in the second supply channel and stores the ink supplied from the main tank;

a sensor that detects a liquid amount of the ink in the storage tank; and a supply pump that supplies the ink from the main tank to the storage tank, wherein the processor executes the clearance process when the liquid amount in the storage tank does not reach a second threshold value within a second predetermined time from driving of the supply pump.

8. The image forming apparatus according to claim 2, further comprising a heating device provided in the first supply channel, wherein the processor controls the heating device to heat the first supply channel in the clearance process.

9. The image forming apparatus according to claim 2, further comprising:

a circulation channel for delivering the ink in the second supply channel to a channel between the main tank and a location on the first supply channel, without allowing the ink to pass through the ink head, the location being a location that is likely to be clogged with the ink; and a circulation pump that delivers the ink in the second supply channel to the first supply channel through the circulation channel, wherein the processor controls the circulation pump such that the ink in the second supply channel is delivered to the first supply channel through the circulation channel in the clearance process.

10. The image forming apparatus according to claim 2, further comprising an external force application device that applies an external force to the ink in the first supply channel, wherein the processor controls the external force application device so as to apply an external force to the ink in the first supply channel in the clearance process.

11. The image forming apparatus according to claim 2, wherein the discharge channel includes:

a lower channel for discharging the ink on a lower end side, in a vertical direction, of the first supply channel; and an upper channel for discharging the ink on an upper end side, in the vertical direction, of the first supply channel.

12. The image forming apparatus according to claim 11, wherein the processor controls the switching valve such that at least one of the upper channel and the lower channel is connected to the first supply channel, depending on a cause of clogging with the ink on the first supply channel.

13. The image forming apparatus according to claim 1, wherein the discharge channel and the second supply channel are connected to the first supply channel at a branch point; and the switching valve including a discharge valve disposed downstream of the branch point in the discharge channel, a supply valve disposed downstream of the branch point in the second supply channel, or both the discharge valve and the supply valve.

14. The image forming apparatus according to claim 13, wherein the switching valve includes both the discharge valve and the supply valve.

15. The image forming apparatus according to claim 3, further comprising a supply pump that supplies the ink from the main tank to the waste liquid tank when executing the clearance process.

* * * * *